United States Patent
Fischer

[15] 3,654,999
[45] Apr. 11, 1972

[54] IMPLEMENT CARRIER

[72] Inventor: Raymond C. Fischer, Hinsdale, Ill.

[73] Assignee: International Harvester Company, Chicago, Ill.

[22] Filed: Jan. 19, 1970

[21] Appl. No.: 3,702

[52] U.S. Cl..............................172/311, 172/456, 280/411, 16/35
[51] Int. Cl. .....................................A01b 65/02, B60d 1/18
[58] Field of Search.................172/311, 456, 649, 662, 673, 172/446, 477, 478, 479, 488, 645, 647, 649, 651, 656; 16/35, 44; 280/411, 411.1, 412, 413

[56] References Cited

UNITED STATES PATENTS

| 3,539,016 | 11/1970 | Bauer et al. | 172/311 |
| 3,122,210 | 2/1964 | French | 172/456 |
| 2,974,737 | 3/1961 | Dlugosch | 172/456 |
| 3,194,578 | 7/1965 | Kiecker | 16/35 |
| 2,787,477 | 4/1957 | Melroe | 280/411.1 |
| 2,828,597 | 4/1958 | Moore | 172/456 |
| 2,966,219 | 12/1960 | French | 172/456 |
| 3,169,027 | 2/1965 | Oerman | 172/456 |
| 3,302,956 | 2/1967 | Sosalla | 280/411.1 |
| 3,428,333 | 2/1969 | Nelson | 172/456 |
| 3,523,699 | 8/1970 | Sinkule et al. | 172/311 |

Primary Examiner—Robert E. Pulfrey
Assistant Examiner—C. W. Hanor
Attorney—Noel G. Artman

[57] ABSTRACT

A relatively wide, winged field implement has transversely aligned tool-carrying wing sections hinged together on a vertical axis so that the wings can be swung to a longitudinally extending position behind the propelling tractor to facilitate transport, particularly over roads and through gates and the like, draft transmitting members extending from the outer ends of the wings to the main implement frame being connected to the main frame by latch means which can be controlled by the operator from his station on the tractor.

2 Claims, 7 Drawing Figures

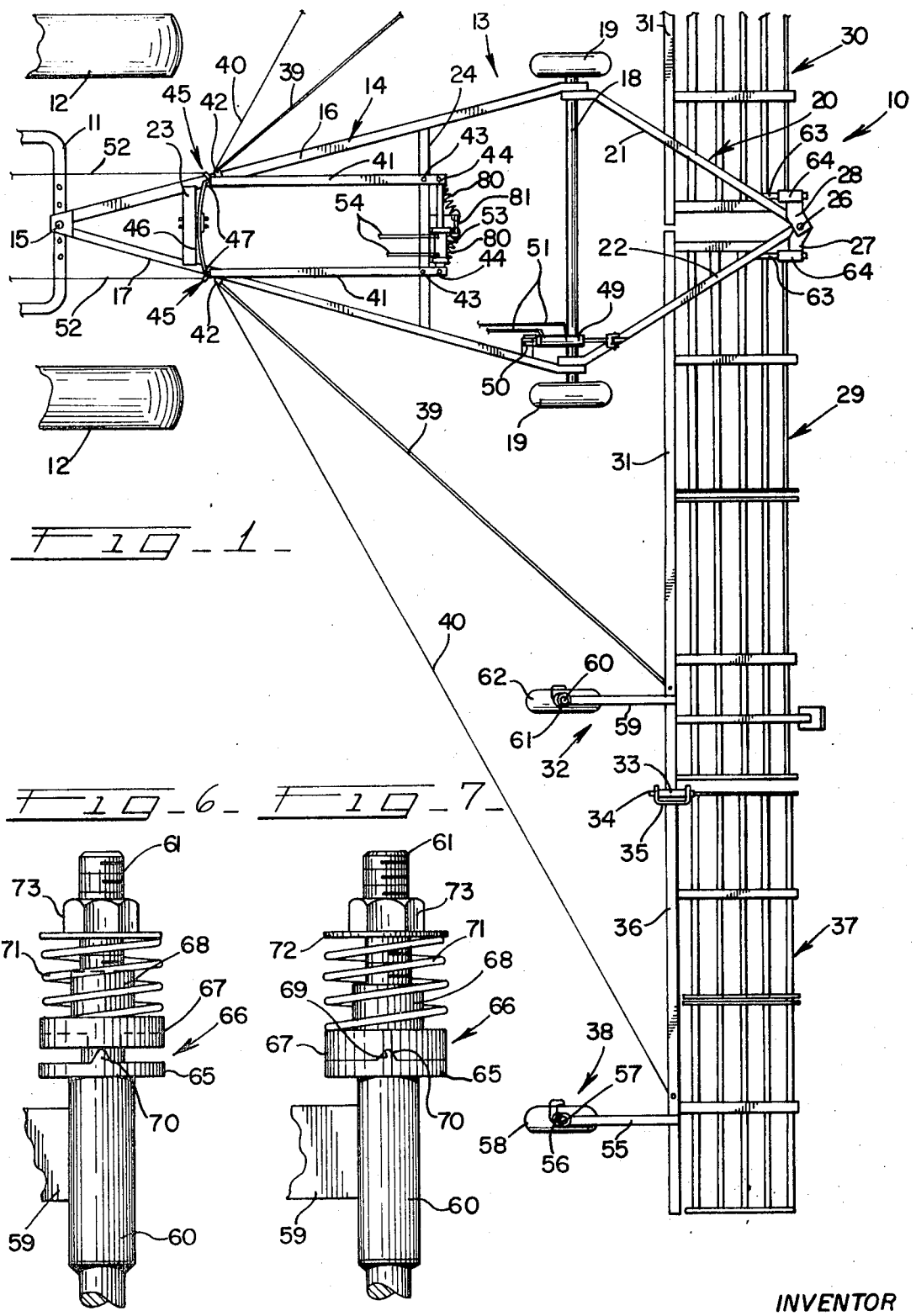

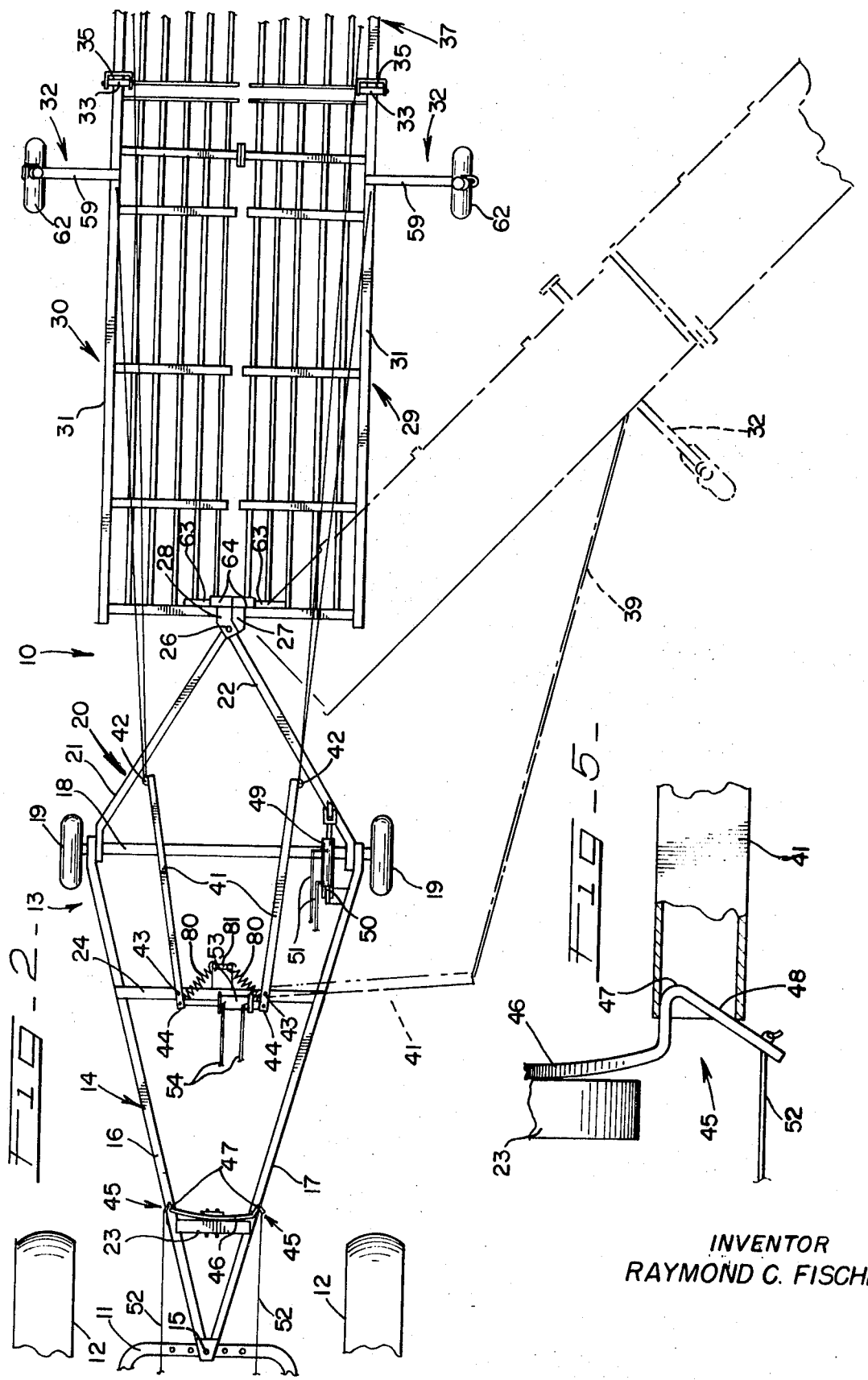

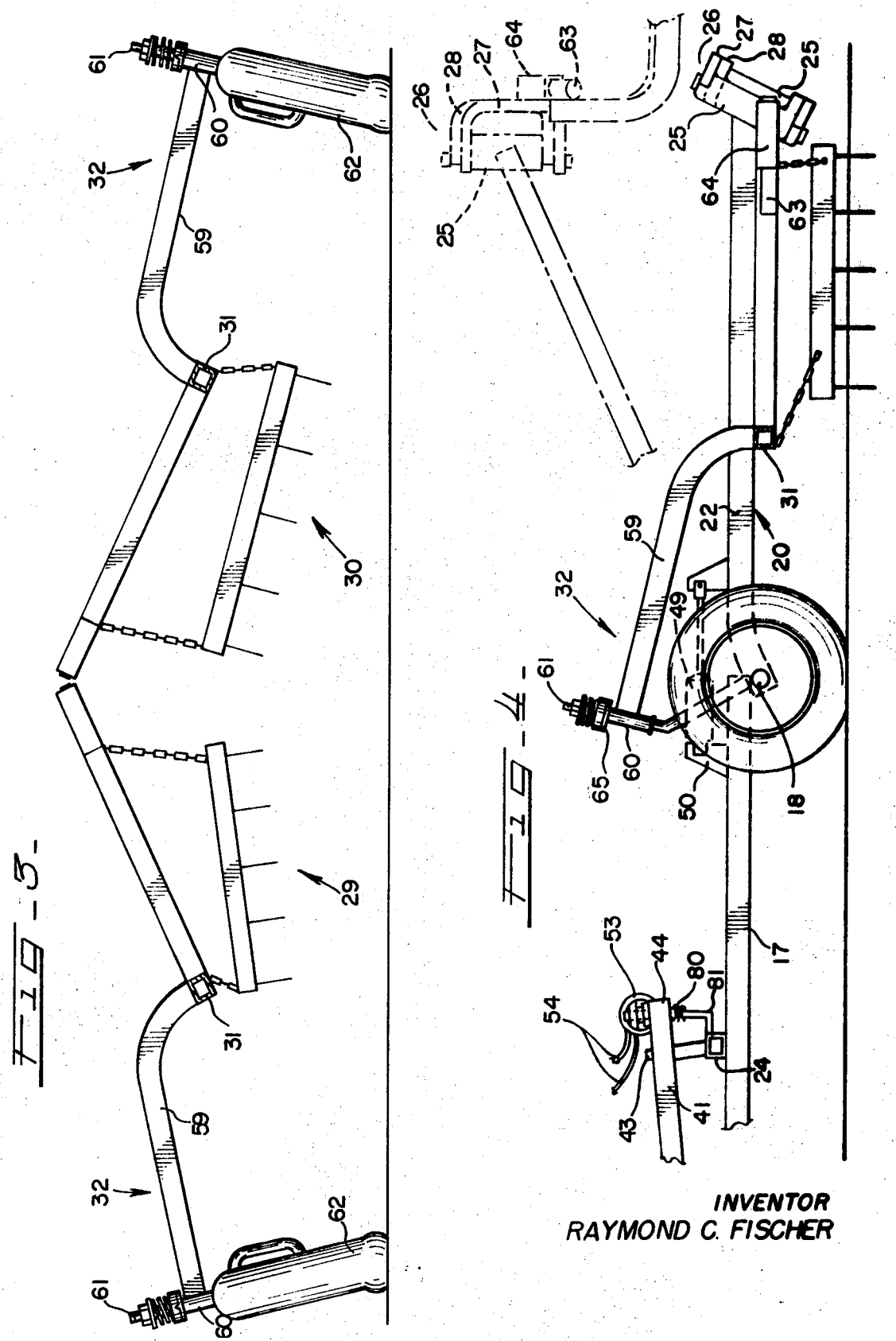

IMPLEMENT CARRIER

BACKGROUND OF THE INVENTION

This invention relates to agricultural implements and particularly to field cultivators and the like. More specifically, the invention concerns relatively wide, winged implements. Winged implements are well known, and also well known is the problem of transporting such implements. Usually the wings are centrally hinged and sometimes extra width is provided by the addition of other wing sections to the outer ends of the main wing sections, the hinge allowing the sections to be swung rearwardly into alignment with the tractor for transport. This conversion of the implement from operating to transport position and back has required considerable time and effort on the part of one or more operators, particularly in removing and replacing the draft connections extending between the implement main frame and the wing sections, and in manually shifting the wings between the two positions.

The present invention has for its object the provision of an improved winged implement and novel means for converting it from its wide-spread operating to an in-line transport position.

Another object of the invention is the provision of a winged implement wherein connectors are provided on the implement main frame to which the flexible draft cables from the wing sections are connected, the connectors being shiftable from one position during operation of the implement to another position for transport while retaining the cable connection therebetween and the wing sections.

Another object of the invention is the provision of novel draft connecting means between the wing sections of an implement and the main frame wherein the connecting means is locked to the main frame in the operating position by means which is releasable by the operator from his station on the tractor so that the wings can swing to their transport position automatically when the propelling tractor is advanced.

DESCRIPTION OF THE DRAWINGS

FIG. 1 is a diagrammatic plan view of the rear end of a tractor to which is connected a winged implement incorporating the features of this invention, with the implement shown in its operating position;

FIG. 2 is a diagrammatic plan view of the structure shown in FIG. 1 with the wing sections in their folded non-operating or transport position;

FIG. 3 is a diagrammatic enlarged rear elevation showing the arrangement of parts of the raised and folded implement as in FIG. 2;

FIG. 4 is an enlarged diagrammatic side elevation of a portion of the structure shown in FIG. 1;

FIG. 5 is an enlarged detail of a portion of the latch structure shown in FIG. 1;

FIG. 6 is an enlarged detail of a portion of the wheel mounting structure for the main wing section for the castering position of the supporting wheel; and FIG. 7 is a view similar to FIG. 6 showing the locked position the castering wheel assumes when the implement has been folded for transport.

DESCRIPTION OF THE PREFERRED EMBODIMENT

The implement shown in the drawings is a peg-toothed harrow designated by the numeral 10 and is adapted for connection to the drawbar 11 of a tractor having laterally spaced rear drive wheels 12 and a conventional operator's station, not shown.

The implement 10 comprises a main supporting frame 13 having a triangular forward portion 14 the forward end of which carries a hitch pin 15 for pivotal connection of the implement to the drawbar 11. The rearwardly diverging bars 16 and 17 of forward frame portion 14 are provided with openings at their ends to rotatably receive an axle 18 upon the ends of which are mounted supporting wheels 19.

The implement frame 13 also includes a triangular rear portion 20 comprising forwardly diverging bars 21 and 22 the rear ends of which are apertured for pivotal mounting on axle 18. Forward frame portion 14 is strengthened by the provision of forward and rearward braces 23 and 24, respectively.

The rear end of frame portion 20 is affixed to a bearing 25 the axis of which, in the operating position of the implement as indicated in FIG. 4, is tilted rearwardly from the vertical. Bearing 25 carries a hinge pin 26 upon which are mounted arms 27 and 28 affixed to the adjacent rear ends of a pair of tool carrying main wing sections 29 and 30, respectively. Each of the main wing sections 29 and 30 is a conventional peg-toothed harrow frame structure and each includes a forward frame bar 31, upon which is mounted a forwardly extending supporting wheel assembly 32, and has mounted at its outer end a bearing 33 extending longitudinally of the direction of travel in the operating position of the implement, as shown in FIG. 1, and carries a pivot pin 34 upon which is mounted a clevis 35 secured to the inner end of a frame bar 36 forming part of an outer wing section 37, supported by another forwardly extending wheel assembly 38.

During operation of the implement in the position of FIG. 1, draft is transmitted to the main wing sections 29 and 30 by the provision of draft transmitting members in the form of flexible cables 39 anchored at their rear ends to the outer ends of forward frame member 31, and by flexible cables 40 anchored at their rear ends to the outer portions of forward frame members 36 of outer wing sections 37.

The forward ends of each pair of draft cables 39 and 40 on opposite sides of the implement are connected, respectively to the main frame 13 through the intermediary of a pair of connector members in the form of tubular arms 41, the forward ends of the cables being secured to lugs 42 affixed to the forward ends of the connector arms.

Arms 41 function as levers the rear portions of which are mounted on pivot pins 43, a portion 44 of each connector extending rearwardly beyond said pivot. Thus, it should be clear that connector arms 41 are capable of swinging about the vertical pivots 43 from the operating position of FIG. 1 to the implement transport position of FIG. 2. The connector arms 41 are releasably locked in the operating position of FIG. 1 by the provision of latch means indicated at 45 comprising a curved flexible spring steel member 46 centrally affixed to brace 23.

The outer ends of member 46 are bent rearwardly and provided with a reverse bend to form at each end a latch 47 having a forwardly angled cam portion 48, clearly shown in FIG. 5. The latch 47 at each end of member 46 is receivable in the open forward end of each of the tubular connector arms 41.

When the implement is to be converted from the operating position of FIG. 1 to the transport position of FIG. 2, the earth working units formed by the main wing sections 29 and 30 and the outer sections 37 are first lifted to the dotted line position of FIG. 4 by the provision of a hydraulic cylinder 49 anchored at one end to a lug 50 affixed to the rear end of bar 17 of forward main frame portion 14, and at its other end to bar 22 of rear main frame portion 20. Fluid under pressure is supplied to cylinder 49 through hose lines 51 from a conventional fluid pressure source, not shown, on the tractor and under the control of the tractor operator. Contraction of the hydraulic ram or cylinder 49 swings the rear frame portion 20 and implement wing sections 29, 30, and 37 upwardly about the axis of shaft 18. This shifts the hinge pin 26 from the solid line tilted position to the dotted line substantially vertical position of FIG. 4.

Latch means 45 is under the control of the tractor operator and each of the latch members 47 is made accessible by the provision of ropes or cables 52 connected to the ends of cam portions 48.

The tractor operator pulls cables 52 against the bias of spring 46 to withdraw and release latch 47 from the end of each connector arm 41. A hydraulic cylinder 53 connected between the extensions 44 of connector arms 41 is then actuated. This cylinder receives fluid under pressure through hose lines 54 from the same source, not shown, as cylinder 49.

Cylinder 53 is retracted, which swings connector arms 41 outwardly, as indicated in phantom lines in FIG. 2, allowing the implement wings to also swing rearwardly. The tractor's forward motion will complete the folding of the wing sections until the tension on draft cables 39 and 40 are tight, at which time the arms 41 will be in the position of FIG. 2, and cylinder 53 will have shifted from a location rearwardly of pivot 43 to a location just forwardly thereof. Extension of the cylinder 53 and the subsequent forward travel of the tractor will then complete the swing of arms 41 and of the implement wing sections to their transport position.

In the operating position, in order to facilitate proper trailing of the implement when turning, the wheel assemblies 32 and 38 are of the castering type. Each outer wheel assembly 38 comprises a support 55 affixed to and projecting forwardly from frame bar 36 and carrying a bearing 56 in which is rotatable the upper end of a spindle 57 carrying at its lower end a wheel 58, as shown in FIG. 1.

Each inner wheel assembly 32 comprises a supporting member 59 affixed to and extending forwardly from frame bar 31 and having secured to its end a bearing 60 in which is rotatable the upper end of a spindle 61 carrying at its lower end a wheel 62. Since wheels 58 and 62 caster, turning the implement as at the end of a field is accomplished without the wheels scuffing over the ground.

Further, in the operating position of the implement, outer wing section 37 is capable of floating vertically relative to main wing section 29 about the axis of pivot pin 34 to accommodate the outer wing to changes in ground contour. Each of main wing sections 29 and 30 are also mounted for floating movement relative to rear frame portion 20 by the provision of a longitudinally extending pivot pin 63 affixed to the inner end of wing 29 and rotatably receivable in a bearing 64 affixed to bearing 25.

The substantially vertical position of hinge 26 in transport facilitates horizontal swinging of the implement sections between operating and transport positions, and to maintain the attitude of the implement on side slopes in transport, the castering inner wheel assemblies 32 on the main wings 29 and 30 are provided with means whereby the wheels 62 are locked. For this purpose an enlarged flange member 65 is affixed to the upper end of bearing 60 and forming part of a ratchet mechanism 66 including a mating flange member 67 having a hub portion 68 splined to and slidably received on spindle 61 and having a V-shaped notch 69 adapted, upon swinging of wheel 62 to the transport position of FIG. 2, to receive a V-shaped lug 70 on flange member 65, the locked position being shown in FIG. 7. The parts are yieldably held in this position by the provision of a coil spring 71 confined between flange 67 and a collar 72 abutting a spring tension adjusting nut 73 on the threaded upper end of the spindle.

Upon reconverting the implement from its transport position to the operating position of FIG. 1, cylinder 53 is retracted to swing connector arms 41 outwardly, and as the implement wing sections swing horizontally, and before the operating position of the implement is reached, ground resistance against wheels 62 will overcome the spring load on latching mechanism 66 and the wheel will again become a castering unit with the parts as shown in FIG. 6.

As the connector arms 41 swing forwardly as cylinder 53 is retracted, a pair of springs 80, as best shown in FIG. 4, having one of their respective ends attached to a spring mounting member 81 secured to the rearward brace 24 and having their other ends attached to the extensions 44, will bias connector arms 41 past the dead center position and place the cylinder rearwardly of pivots 43. Upon extending the cylinder 53, the conversion to field operation will be completed when the end of each arm 41 engages and rides up the cam face of member 48, depressing spring 46 until latch members 47 snap into the hollow end of each arm. Cylinder 49 is then extended to lower rear frame portion 20 and the implement is again ready for field operation.

What is claimed is:

1. A transversely elongated implement adapted for attachment to a tractor comprising, a main frame with supporting wheels mounted for rotation along a transverse axis, a pair of implement sections transversely aligned in their operating position, central longitudinal hinge means pivotally mounted on said main frame along said transverse axis, means carried by said main frame and connected to said central longitudinal hinge means for pivoting the latter relative to the former, means pivotally connecting the inner ends of said implement sections to said hinge means for horizontal swinging rearwardly from said operating position to a transport position substantially parallel to each other and to the direction of travel of the implement, draft transmitting members extending between said main frame and the laterally outer portions of said implement sections, means in the connection of said draft members to said main frame accommodating said rearward swinging of the implement sections while maintaining the connection of said draft members between the main frame and said implement sections unimpaired, and wherein implement supporting wheels are mounted on said implement sections, the axis of said implement supporting wheels correspond to said transverse axis when said implement sections are in their operating position, means mounting said implement supporting wheels for castering and yieldable means provided preventing castering in the transport position of said implement sections, said yieldable means being yieldable by the forces acting on the wheels when the implement sections are swung to their transport position.

2. A transversely elongated implement adapted for attachment to a tractor comprising, a main frame with supporting wheels, a pair of implement sections transversely aligned in their operating position, central longitudinal hinge means pivotally mounted on said frame, means carried by said main frame and connected to said longitudinal hinge means for pivoting the latter relative to the former, means pivotally connecting the inner ends of said implement sections to said hinge means for horizontal swinging rearwardly from said operating position to a transport position substantially parallel to each other and to the direction of travel of the implement, ground engaging wheels carried by said implement sections, draft elements mounted on the forward portion of said main frame and flexible members connecting said draft elements to said implement sections, said draft elements being movable rearwardly upon swinging of said implement sections rearwardly to maintain the connection of said flexible members between said draft elements and said implement sections in the transport position thereof, said draft elements comprise a pair of laterally spaced longitudinally extending bars pivotally mounted about vertical axes on said main frame intermediate their ends, the forward ends of said bars being secured to the main frame by latch means when in the operative position, a hydraulic jack connected at opposite ends to the rear ends of said bars and operative when expanded and contracted to swing said pair of bars about their vertical axes.

* * * * *